United States Patent Office 3,373,140
Patented Mar. 12, 1968

3,373,140
THERMOPLASTIC EPOXY RESIN
PHOTOCONDUCTORS
Siegfried Aftergut, Schenectady, N.Y., assignor to General
Electric Company, a corporation of New York
No Drawing. Filed Sept. 24, 1964, Ser. No. 399,085
7 Claims. (Cl. 260—47)

ABSTRACT OF THE DISCLOSURE

A process is disclosed whereby high molecular weight epoxy resins are reacted in dilute solutions with compounds having phenol and amine groups which are reactive with the epoxy groups to produce reaction products which are substantially free of cross-linking and hence are thermoplastic and soluble. These products are also photoconductive and useful in electrophotographic processes.

---

This invention relates to organic photoconductive materials useful in applications requiring photoconductors such as photoplastic recording and xerography. More particularly, this invention relates to photoconductive materials and to processes of producing them comprising an epoxy resin modified by the addition of an aromatic or heterocyclic amino derivative or phenol.

The recording of information on a deformable photoconductive medium in the form of minute light-modifying deformations is known. By one such method of information storage, the deformations are formed on the storage medium by first charging the surface to a uniform potential, then exposing to electromagnetic radiation and finally making the effect of the radiation visible by heat-softening the deformable storage medium. Exposure to electromagnetic radiation produces a latent electrostatic image. On softening the storage medium, the electrostatic forces cause the formation of physical deformations which correspond to the charge pattern of the latent image. Upon cooling the medium, the deformations become permanently fixed on the surface of the recording medium and are thereby permanently stored unless erased by reheating. The information stored in the form of these deformations is retrieved by projecting a beam of light through the medium. The projecting light is diffracted or refracted by the deformations to produce a spatial light image corresponding to the original image.

The information storage member as known may comprise a two-layer laminate, the first layer being made of a deformable material, and the second layer being made of a photoconductive material. The laminate may be prepared in the form of any suitable configuration such as, for example, a tape, disc or sheet. The recording layer of the laminate is usually prepared from a solid, thermoplastic polymer or a mixture of such polymers which are deformable by the application of heat. The photoconductive layer may be formed from a photoconductive material such as selenium or the polymers of this invention.

It is essential that the photoconductive layer be free from defects and be formed of a composition that provides a smooth flat surface. It is also essential that the photoconductive layer be made of a material that is stable, can be molded easily, cast into films, will not deteriorate in storage, and the constituents will not break down and migrate to other layers resulting in the de-lamination of the tape or disc.

Photoconductive materials are also of importance in the field of xerography. In xerographic processes generally a layer or film of photoconductive material is applied to a conductive metal backing member or a photoconductor may be used in the form of minute particles dispersed in an electrically insulating binder and applied to a suitable backing member. Known materials for the preparation of the photoconducting insulating layer include selenium, sulfur, and zinc oxide. However, these materials have not proven to be entirely satisfactory, such as in light sensitivity and storable qualities.

It is therefore an object of my invention to provide a stable photoconductive material.

It is a further object of my invention to provide an organic photoconductive material which may be easily molded.

It is still a further object of my invention to provide an organic photoconductive material suitable for forming reusable information recording tapes.

Another object of my invention is to provide a photoconductive material that does not deteriorate in storage.

Briefly, this invention relates to the chemical modification of an epoxy resin by co-reacting the epoxy resin with an aromatic or heterocyclic amine or phenol to give a photoconductive material.

Those parts of my invention which are considered to be new are set forth in detail in the claims appended hereto. The invention, however, may be better understood and further objects and advantages thereof appreciated from a consideration of the following description.

The epoxy resins are well known in the art. Generally, they may be described as the reaction product of an epihalogenohydrin such as epichlorohydrin and a phenol having at least two phenolic hydroxy groups such as bis(4-hydroxy phenyl)propane with epichlorohydrin. The structure of a typical epoxy resin prepared by reacting epichlorohydrin with bis-(4-hydroxy phenyl)-2,2-propane is shown in the following formula:

FORMULA I

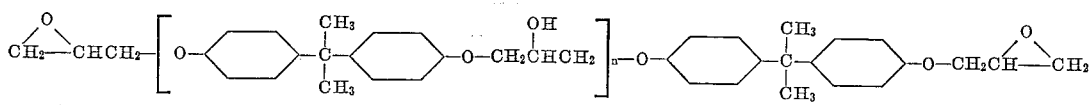

The physical and chemical properties of the resin depend on the number $n$ of repeating units. In resins such as Shell Epon 828, Bakelite ERL 2774, and Ciba Araldite 6010 and Dow 332, where $n$ is about one, the material is fluid at room temperature and has very low free hydroxyl content. Resins such as Epon 1007 and Araldite 6097 are solids melting at 125–135° in which $n$ is 6–8. The resins therefore contain an appreciable amount of hydroxyl. The epoxy group is reactive toward amines, acids, acid anhydrides, phenols, and the other reagents.

In the present invention, the higher molecular weight resins Epon 1007 and Araldite 6097 were chosen rather than the low molecular weight resins represented by Epon 828 so as to achieve both less crystallinity and higher molecular weight in the final product. I prefer to use an epoxy resin having a molecular weight between 2500–5000.

Further, in this invention the applicant eliminates or minimizes cross-linking by running the reactions in dilute solutions at moderate temperatures using an excess of an amine or phenol. Typical epoxy resins suitable for use in this invention are:

TABLE I

| Resin | Type | Manufacturer | Melting Point, °C. | Epoxide Equivalent |
|---|---|---|---|---|
| Araldite | 6097 | Ciba Co. | 130 | 1,800 |
| Do | 6099 | do | 150 | 3,200 |
| Epirez | 540 | Jones-Dabney Co. | 130 | 1,600–2,000 |
| Do | 550 | do | 150 | 2,400–4,000 |
| Epon | 1007 | Shell Chemical Co. | 130 | 1,600–2,000 |
| Do | 1009 | do | 150 | 2,400–4,000 |

The epoxy resin co-reactant comprises aromatic or heterocyclic amines. The former correspond to the general formula

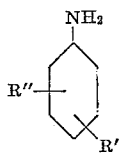

where R' is hydrogen, alkyl, alkoxy, alkylamine, nitro, phenylazo, hydroxy, acyl, aldehydo, halogen, cyano, phenylamino, heterocyclic residue, 2,4-dinitrophenylamino, and R" may be any of these substituents or identical to R'.

The amino derivatives of the aromatic compounds include those derived from naphthalene and anthracene. The amino derivatives of the heterocyclic compounds include those derived from pyridine, pyrrole, indole, imidazoles, indazole, phenazine, acridine, quinaldine, and similar heterocyclics.

The epoxy resin may also be co-reacted with phenol derivatives which correspond to the general formula

where R is $NO_2$, O-alkyl, N-(alkyl)$_2$, CN, phenylazo, and heterocyclic.

The phenol co-reactants may include hydroxyanthracene, hydroxyquinone, hydroxyanthraquinone, alizarin, hydroxydiphenylazonitrobenzene, alizarin blue, and alizarin indigo blue.

poured into a large volume of hexane to precipitate the product. The product was collected, dissolved in methylethylketone and precipitated again into hexane. To remove any unreacted 9-aminoacridine, the solid product was extracted for 24 hours with hot methanol. It was then dried for 24 hours in a vacuum oven at 50°. The product had a softening point of 110° and was yellow in color. It contained 1.35% of nitrogen.

*Example 2*

To a solution of 20 g. of Ciba Epoxy Resin 6097 in 100 ml. of ethyl Cellosolve was added a solution of 2.8 g. of alizarin in 50 ml. of ethyl Cellosolve. The mixture was heated for 17 hours at 125° and cooled. It was then precipitated into hexane, the gummy product was collected, dissolved in methylethyl ketone and the solution was precipitated into hexane. The precipitate was extracted for 24 hours with hot methanol to remove any unreacted alizarin and the product was dried for 24 hours in the vacuum oven at 50°. The softening temperature of the grey-colored product was 83°.

*Example 3*

To a solution of 1.89 g. of 4-aminoquinaldine in benzene was added dropwise, with stirring, a solution of 20 g. of Epon 1007 in methylethyl ketone. The mixture was heated at reflux for 24 hours, cooled, and stirred into a large volume of hexane to precipitate the product. The product was collected, dissolved in methylethyl ketone and reprecipitated into hexane. After collection and drying, it was extracted for 24 hours in a Soxhlet apparatus with boiling methanol. It was then dried in a vacuum oven at 50°.

There are set forth in Table II below further examples using various proportions of epoxy resins and their reactants:

TABLE II.—POLYMERS DERIVED FROM EPOXY RESINS

| Ex. | Weight of Reactants | | Reaction Conditions | | | Properties of Product | | | Percent N required by Theory for Epoxy Equivalent of— | |
|---|---|---|---|---|---|---|---|---|---|---|
| | Epoxy Resin | Other Reactant | Solvent | Temp. (° C.) | Time (Hr.) | Color | M.P. (° C.) | Percent N | 2,000 | 2,500 |
| 4 | 20 g. Epon 1007 | 2.3 g. p-phenyl azoaniline. | MEK-benzene | 80 | 0.5 | Yellow | 110 | 0.33 | 1.9 | 1.5 |
| 5 | 20 g. Araldite 6097 | 2.3 g. p-phenyl azoaniline. | Et Cellosolve | 125 | 17 | Amber | 100-105 | 0.79 | 1.9 | 1.5 |
| 6 | 20 g. Epon 1007 | 3.3 g. 4-amino-2,4-dinitrodiphenylamine. | MEK-benzene | 80 | 0.5 | Dark Brown. | 110 | 1.70 | 2.5 | 2.0 |
| 7 | do | 1.9 g. 4-aminoquinaldine. | MIBK-Bu Cellosolve. | 125 | 16 | Brown | 118 | | 1.3 | 1.1 |
| 8 | do | 2.0 g. 4-methoxy-2-nitro-aniline. | MEK-benzene | 80 | 16 | Orange | 103 | 0.52 | 1.3 | 1.1 |
| 9 | do | 2.9 g. Alizarin | MEK | 80 | 0.5 | Amber | 105 | | | |
| 10 | do | 1.7 g. 2,5-dihydroxy-benzoquinone. | MEK | 80 | 0.5 | Brown | 105 | | | |

MEK=Methyl ethyl ketone.
MIBK=Methyl isobutyl ketone.

In the above reactants the amine (Formula II) or phenol (Formula III) were reacted with the epoxy group to give the following structures:

FORMULA II

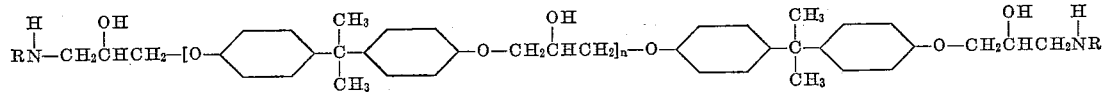

FORMULA III

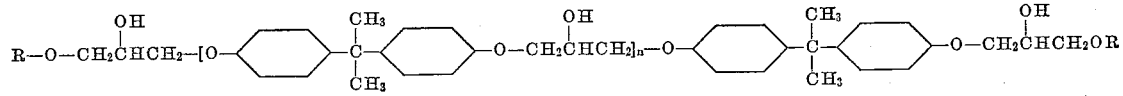

The following examples are given to illustrate the various advantages of the present invention and are not to be taken as limiting in any way.

*Example 1*

To a boiling solution of 20 g. of Shell Epon 1007 in 100 ml. methylethyl ketone was added dropwise with stirring a solution of 2.33 g. of 9-aminoacridine. The mixture was heated at reflux for about 2 hours, cooled, and The reactions in Table II were carried out by dissolving the epoxy resin in the first solvent shown in the Table and adding the resin solution dropwise, with stirring, to the co-reactant dissolved in the second solvent. Where only one solvent is given in the table, this served as a solvent for both the epoxy resin and the other component. At the end of the reaction period, the mixture was added dropwise to a large volume of vigorously agitated hexane to precipitate the product. For further purification the product was dissolved in methyl ethyl ketone and precipitated again into hexane and this was repeated as needed. The product was then collected and extracted for 24 hours with methanol in a Soxhlet apparatus to remove any unreacted adsorbed co-reactant from the product. The product was finally dried for several hours in a vacuum oven at 50–60° C. The products were free-flowing powders and had melting points ranging between 100° and 118° C.

In Table II the theoretical nitrogen content was calculated assuming that complete reaction had occurred. The indications as to chemical structure which could be obtained for the products from the phenols, alizarin and 2,5-dihydroxybenzoquinone, which do not contain nitrogen, were their reactions with sodium hydroxide. Solutions of these products in methyl ethyl ketone were treated with a few drops of aqueous sodium hydroxide. This resulted in color formation and is evidence of incorporation of phenolic residues in the epoxy.

The photoconductive properties of the above-mentioned products were demonstrated by the method of xerography. Each of the products was dissolved in methyl ethyl ketone and a thin film was cast on a glass plate provided with a conducting layer of tin oxide. The film was charged in the dark by corona discharge to a surface potential in excess of 800 volts. The charged film was exposed for 5–30 seconds to an image projected with the aid of a 100 watt mercury vapor lamp. The light intensity at the image plane was about 0.3 milliwatts per square centimeter. After exposure, xerographic powder was cascaded on the surface of the films. All the films prepared from the products described in Examples 1–10 gave good powder images.

As many widely different embodiments of this invention may be made without departing from the spirit and scope thereof, it is to be understood that this invention is not limited to the specific embodiments thereof except as defined in the appended claims.

What I claim as new and desire to secure by Letters Patent of the United States is:

1. A photoconductive thermoplastic material comprising the reaction product of an epoxy resin formed from epichlorohydrin and bis-(4-hydroxy phenyl)-2,2-propane, said resin having an epoxide equivalent weight of between about 1500 and 5000, and a compound selected from the nuclear substituted primary monoamino derivatives of the group consisting of naphthalene, anthracene, pyridine, pyrrole, indole, imidazole, indazole, phenazine, acridine and quinaldine, said product being formed by reacting said resin and said compound at a temperature between 80° C. and 125° C., said compound being present in an amount in excess of that required to completely react with the terminal epoxy groups of said resin.

2. A photoconductive thermoplastic material comprising the reaction product of a nepoxy resin formed from epichlorohydrin and bis-(4-hydroxy phenyl)-2,2-propane, said resin having an epoxide equivalent weight of between about 1500 and 5000, and a compound having the formula

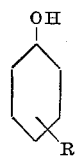

in which R is selected from the group consisting of the NO₂, O-alkyl, N-(alkyl)₂, CN, phenylazo, hydroxy, quinone and naththoquinone radicals, said product being the result of a reaction between the hydroxyl radical of said compound and the epoxy groups of said resin to produce a product which is substantially free of cross-linking, said reaction being carried out at a temperature between 80° C. and 125° C., said compound being present in an amount in excess of that required to completely react with the terminal epoxy groups of said resin.

3. The process of forming a photoconductive thermoplastic material comprising:

(1) reacting an epoxy resin formed from epichlorohydrin and bis-(4-hydroxy phenyl)-2,2-propane, said resin having an epoxide equivalent weight of between about 1500 and 5000, with a compound selected from the nuclear substituted primary monoamino derivatives of the group consisting of naphthalene, anthracene, pyridine, pyrrole, indole, imidazole, indazole, phenazine, acridine and quinaldine; and (2) heating the reactants at a temperature between 80° C. and 125° C. to complete the reaction, said compound being present in an amount in excess of that required to completely react with the terminal epoxy groups of said resin.

4. The process of forming a photoconductive thermoplastic material comprising:

(1) reacting an epoxy resin formed from epichlorohydrin and bis-(4-hydroxy phenyl)-2,2-propane, said resin having an epoxide equivalent weight of between about 1500 and 5000, with a compound having the formula

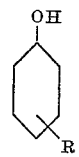

in which R is selected from the group consisting of the NO₂, O-alkyl, N-(alkyl)₂, CN, phenylazo, hydroxy, quinone and napthoquinone radicals, and (2) heating the reactants at a temperature between 80° C. and 125° C. to complete the reaction, said compound being present in an amount in excess of that required to completely react with the terminal epoxy groups of said resin.

5. The product of claim 2 wherein said compound is selected from the group consisting of hydroxyanthracene, hydroxyquinone, hydroxyanthraquinone, hydroxydiphenylazonitrobenzene, alizarin, alizarin blue, and alizarin indigo blue.

6. The process according to claim 4 wherein said compound is selected from the group consisting of hydroxyanthracene, hydroxyquinone, hydroxyanthraquinone, hydroxydiphenyl-azonitrobenzene, alizarin, alizarin blue, and alizarin indigo blue.

7. A photoconductive thermoplastic material comprising the reaction product of an epoxy resin formed from epichlorohydrin and bis-(4-hydroxy phenyl)-2,2-propane, said resin, having an epoxide equivalent weight of between about 1500 and 5000, and a compound selected from the group consisting of 9-aminoacridine, 4-amino-quinaldine, p-phenyl azoaniline, 4-amino 2,4-dinitro-diphenylamine, and 4-methoxy-2-nitroaniline, said product being formed by reacting said resin and said compound at a temperature between 80° C. and 125° C., said resin being present in an amount in excess of stoichiometric proportion.

References Cited

UNITED STATES PATENTS

| | | | |
|---|---|---|---|
| 3,317,471 | 5/1967 | Johnson et al. | 260—47 |
| 2,865,886 | 12/1958 | Greenlee | 260—78 |
| 2,865,888 | 12/1958 | Greenlee | 260—47 |
| 2,945,004 | 7/1960 | Greenlee | 260—47 |
| 2,999,832 | 9/1961 | Faerber | 260—37 |
| 3,025,160 | 3/1963 | Bunge et al. | 260—37 |
| 3,051,084 | 8/1962 | Scheible | 260—37 |
| 3,112,197 | 11/1963 | Neugebauer et al. | 96—1.6 |

OTHER REFERENCES

Lee et al.: "Epoxy Resins," page 15 relied on, McGraw-Hill Book Co., Inc., New York, 1957.

WILLIAM H. SHORT, Primary Examiner.

T. D. KERWIN, Assistant Examiner.